United States Patent
Li et al.

(10) Patent No.: US 7,331,100 B2
(45) Date of Patent: Feb. 19, 2008

(54) PROCESS OF MANUFACTURING A SEED/AFM COMBINATION FOR A CPP GMR DEVICE

(75) Inventors: Min Li, Dublin, CA (US); Cheng T. Horng, San Jose, CA (US); Cherng Chyi Han, San Jose, CA (US); Yue Liu, Fremont, CA (US); Yu-Hsia Chen, San Jose, CA (US); Ru-Ying Tong, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 473 days.

(21) Appl. No.: 10/886,288

(22) Filed: Jul. 7, 2004

(65) Prior Publication Data

US 2006/0007605 A1    Jan. 12, 2006

(51) Int. Cl.
   *G11B 5/187*    (2006.01)
   *B05D 5/12*    (2006.01)

(52) U.S. Cl. .............. 29/603.14; 29/603.13; 427/404; 427/131; 427/132; 360/126; 360/324; 360/324.12; 360/326; 428/812

(58) Field of Classification Search ............. 29/603.14, 29/603.13, 603.15, 603.18, 603.07; 216/22; 427/404, 131, 132; 428/812, 811.2, 811.3; 360/122, 125, 126, 313, 319, 324, 324.11, 360/324.12, 326

See application file for complete search history.

(56) References Cited

U.S. PATENT DOCUMENTS

| | | | |
|---|---|---|---|
| 5,627,704 A | 5/1997 | Lederman et al. | |
| 5,668,688 A | 9/1997 | Dykes et al. | |
| 6,574,079 B2 | 6/2003 | Sun et al. | 360/324.2 |
| 6,636,389 B2 | 10/2003 | Gill | 360/314 |
| 6,683,762 B2 | 1/2004 | Li et al. | 360/324.11 |
| 7,196,878 B2 * | 3/2007 | Fox et al. | 360/324.11 |
| 2002/0048127 A1 | 4/2002 | Fukuzawa et al. | 360/324.1 |
| 2002/0097534 A1 | 7/2002 | Sun et al. | 360/324.2 |
| 2002/0191356 A1 | 12/2002 | Hasegawa et al. | 360/324.11 |
| 2003/0026049 A1 | 2/2003 | Gill | 360/324.12 |
| 2003/0227723 A1 | 12/2003 | Li et al. | 360/324.11 |
| 2004/0004261 A1 | 1/2004 | Takahashi et al. | 257/414 |
| 2005/0024792 A1 | 2/2005 | Li et al. | 360/324.11 |

FOREIGN PATENT DOCUMENTS

JP    2000-348335    * 12/2000

OTHER PUBLICATIONS

Digest Inter mag 2002, The 2002 IEEE International Magnetics Conference Apr. 28-May 2, RAI Congress Center, Amsterdam, The Netherlands, CA 02, CA 03, GA 05.

* cited by examiner

*Primary Examiner*—A. Dexter Tugbang
(74) *Attorney, Agent, or Firm*—Saile Ackerman LLC; Stephen B. Ackerman

(57) ABSTRACT

An improved seed/AFM structure is formed by first depositing a layer of tantalum on the lower shield. A NiCr layer is then deposited on the Ta followed by a layer of IrMn. The latter functions effectively as an AFM for thicknesses in the 40-80 Angstrom range, enabling a reduced shield-to-shield spacing.

17 Claims, 3 Drawing Sheets

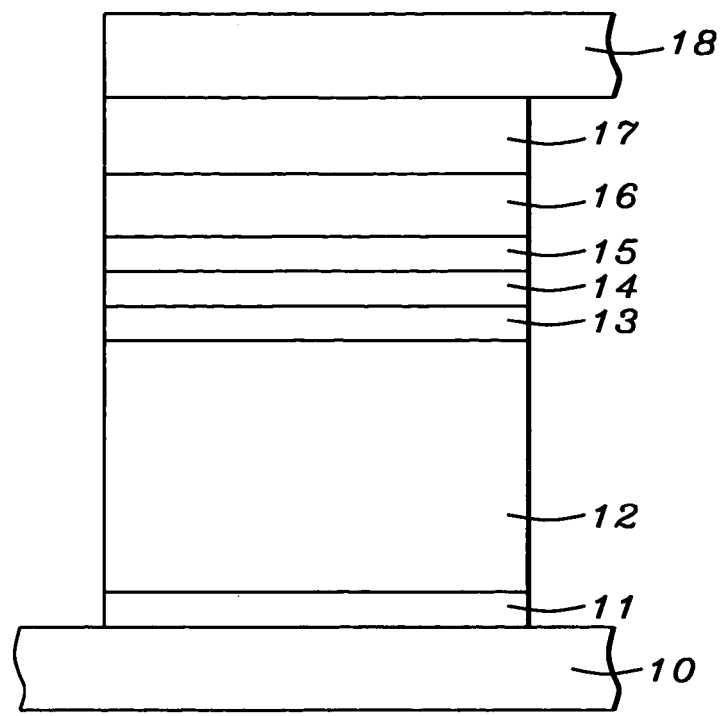
*FIG. 1 - Prior Art*
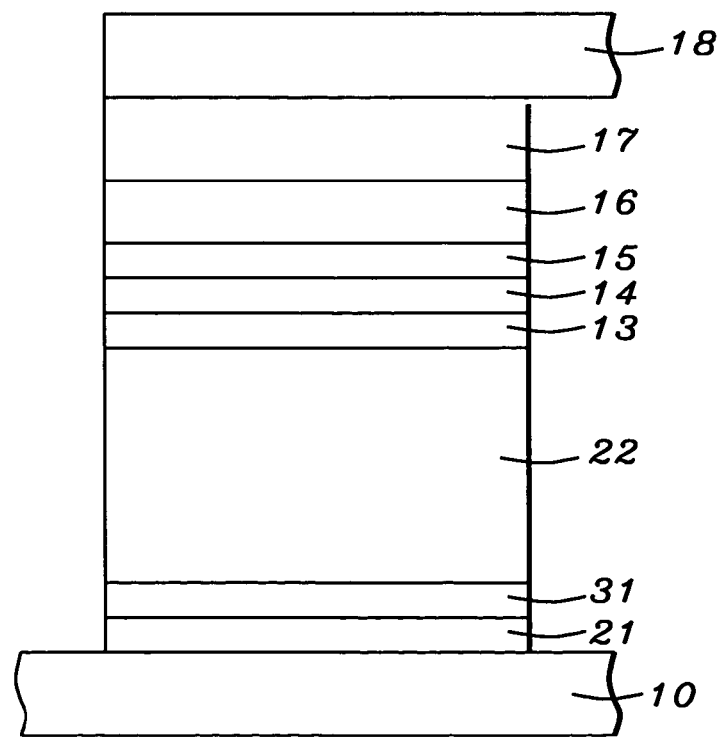
*FIG. 2*

PROCESS OF MANUFACTURING A SEED/AFM COMBINATION FOR A CPP GMR DEVICE

FIELD OF THE INVENTION

The invention relates to the general field of CPP GMR read heads with particular reference to the pinning layer and its associated seed layer.

BACKGROUND OF THE INVENTION

The principle governing the operation of most magnetic read heads is the change of resistivity of certain materials in the presence of a magnetic field (magneto-resistance or MR). Magneto-resistance can be significantly increased by means of a structure known as a spin valve where the resistance increase (known as Giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

The key elements of a spin valve are illustrated in FIG. 1. They are lower magnetic shield 10 on which is seed layer 11. Antiferromagnetic (AFM) layer 12 is on seed layer 11. Its purpose is to act as a pinning agent for a magnetically pinned layer. The latter is typically a synthetic antiferromagnet formed by sandwiching antiferromagnetic coupling layer 14 between two antiparallel ferromagnetic layers 13 (AP2) and 15 (AP1).

Next is a copper spacer layer 16 on which is low coercivity (free) ferromagnetic layer 17. Capping layer 18 lies atop free layer 17. When free layer 17 is exposed to an external magnetic field, the direction of its magnetization is free to rotate according to the direction of the external field. After the external field is removed, the magnetization of the free layer will stay at a direction, which is dictated by the minimum energy state, determined by the crystalline and shape anisotropy, current field, coupling field and demagnetization field.

If the direction of the pinned field is parallel to the free layer, electrons passing between the free and pinned layers suffer less scattering. Thus, the resistance in this state is lower. If, however, the magnetization of the pinned layer is anti-parallel to that of the free layer, electrons moving from one layer into the other will suffer more scattering so the resistance of the structure will increase. The change in resistance of a spin valve is typically 10-20%.

Earlier GMR devices were designed to measure the resistance of the free layer for current flowing parallel to its two surfaces. However, as the quest for ever greater densities has progressed, devices that measure current flowing perpendicular to the plane (CPP) have also emerged. CPP GMR heads are considered to be promising candidates for the over 100 Gb/in$^2$ recording density domain (see references 1-3 below).

A routine search of the prior art was performed with the following references of interest being found:

U.S. Pat. No. 6,683,762 (Li et al) disclose Ta/NiFe as an example of a seed layer and IrMn as the possible composition of the AFM layer. Note that, although a Ta/NiCr seed layer is mentioned in the specification, this appears to have been a typographical error since only Ta/NiFe seeds are specified in the claims.

In U.S. Pat. No. 6,574,079, Sun et al. discuss Ta and NiCr alloys for the seed layer. However, they disclose Ta only, NiCr only or a Ta—NiCr alloy; which behaves differently from a Ta/NiCr two layer structure.

U.S. Pat. Publication 2002/0191356, Hasegawa et al. teach an underlayer of Ta, seed layer with NiCr together with an AFM layer of IrMn. However, this is for a CIP GMR structure where the Ta/NiCr seed layer is grown on alumina. In the present invention, the seed layer is grown on NiFe bottom shield and is for CPP application. Additionally the present invention teaches a Ta thickness range of around 3-10 A, a thickness range not claimed in 2002/0191356.

In U.S. Pat. No. 6,636,389, Gill shows a deposited NOL layer between two free layers which is a different use of a NOL from that disclosed by the present invention. In U.S. Pat. Publication 2004/0004261, Takahashi et al. mention an NOL-GMR but provide no details. What is discussed is a half-metal oxide layer as the AP1 or free layer in a CPP GMR. It has no bearing on the present invention.

In U.S. Pat. Publication 2002/0048127, Fukuzawa et al. discloses Ta as the seed layer and IrMn as the AFM layer. Cu is not mentioned as the base metal, but plasma etch and oxidation to form the NOL layer are discussed in great detail. This invention is directed to specular NOL layer formation in AP1 for CIP GMR applications. The NOL structure and plasma etch/oxidation conditions are totally different from those of the present invention.

REFERENCES

[1] M. Lederman et al. U.S. Pat. No. 5,627,704.
[2] J. W. Dykes et al. U.S. Pat. No. 5,668,688

SUMMARY OF THE INVENTION

It has been an object of at least one embodiment of the present invention to provide a CPP GMR magnetic read head having an improved GMR ratio.

Another object of at least one embodiment of the present invention has been to provide a magnetic read head having an improved Resistance Area Product.

A further object of at least one embodiment of the present invention has been to provide a process for manufacturing said read head.

Still another object of at least one embodiment of the present invention has been that said process be compatible with existing processes for the manufacture of CPP GMR devices.

These objects have been achieved by replacing the conventional seed layer (typically Ta) with a bilayer of NiCr on Ta, said seed being deposited on the NiFe layer that constitutes a magnetic shield. Additional improvement is also obtained if the conventional non-magnetic spacer layer of copper is replaced by a sandwich structure of two copper layers with an NOL (nano-oxide layer) between them.

BRIEF DESCRIPTION OF THE DRAWINGS

FIG. 1 shows a GMR stack of the prior art in which has conventional seed layer and spacer layers.

FIG. 2 shows a GMR stack according to the teachings of the present invention. having an improved seed layer.

DESCRIPTION OF THE PREFERRED EMBODIMENTS

Figure 3:
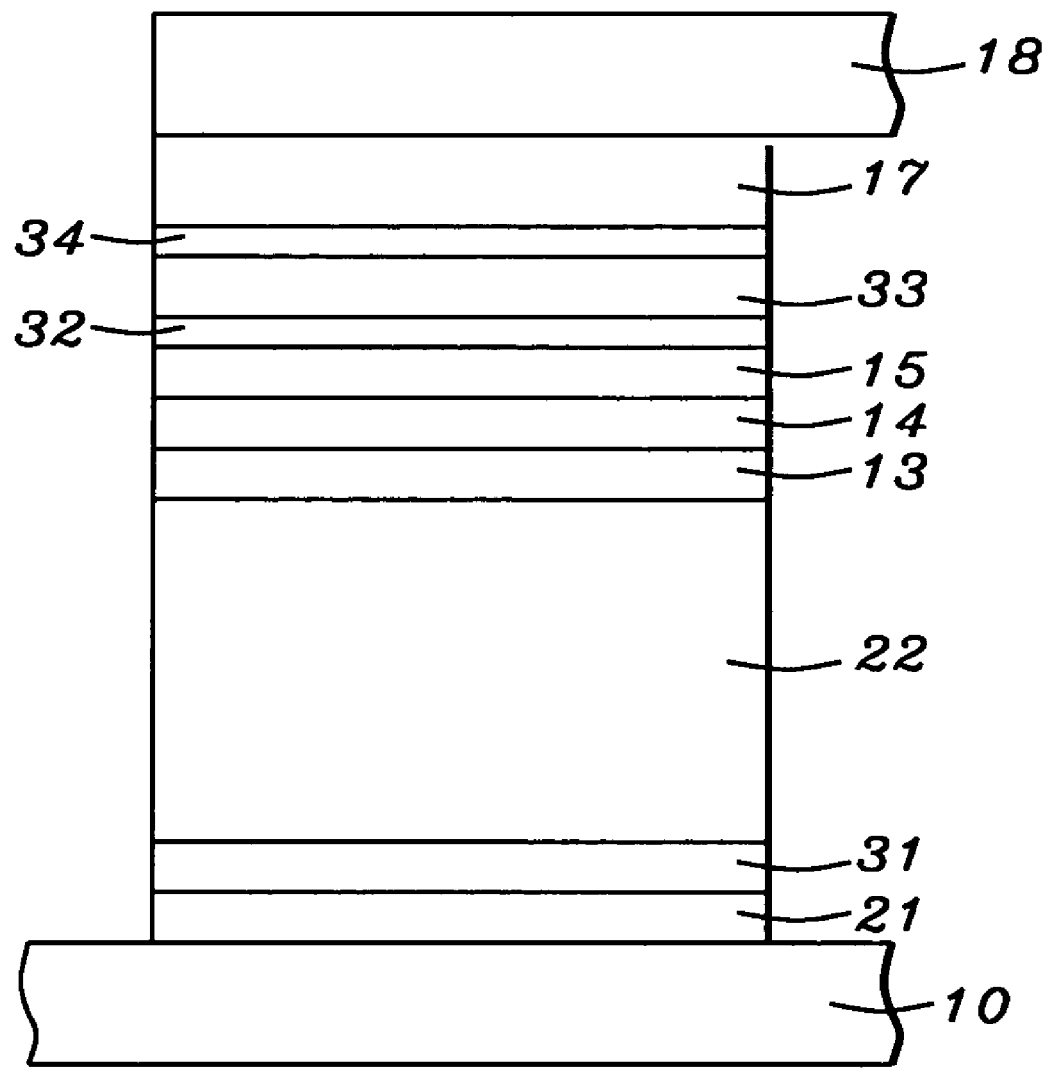
FIG. 3 shows the GMR stack of FIG. 2 with an improved spacer layer.

In the CPP GMR head structure, a synthetic spin valve type film stack is employed for bias and stability reasons. The generic CPP spin valve structure has already been discussed above in relation to FIG. 1. One of the important parameters that defines a CPP device is R.A, the resistance area product. Currently, CPP devices have been achieving R.A values of 0.05 to 0.1 ohm.μm$^2$. Higher values than this are to be desired for improved performance.

One solution has been to use a NOL (nano-oxide layer) sandwiched between two layers of copper as the non-magnetic spacer layer. Since conduction between the two copper layer occurs only where there are pin-holes in the NOL, a higher transverse resistance is obtained without any apparent reduction in area. This can increase the R.A to about 0.6-1 ohm.μm$^2$ with CPP GMR=3-5%.

However, passing current via pinholes may result in head reliability problems. In the present invention, a new seed layer/AFM structure is disclosed together with the use of ion assisted oxidation to oxidize a layer of AlCu. Additionally, prior to AlCu oxidation, a pre-ion beam treatment is used to precipitate Cu out of the AlCu so as to form reproducible metallic conduction paths.

It is desirable for a CPP spin valve structure to have a thin seed layer and a thin AFM layer so as to reduce shield to shield spacing; a thicker AP1/AP2 gives a better CPP GMR ratio, which requires better exchange coupling between AP2 and AFM. Previously, Ta50/Ru20/PtMn was used. The resulting thickness of the seed layer and AFM is undesirably large for high density applications. Also, the reliability of Ta/Ru/PtMn type spin valves, as in CIP-GMR heads, is a concern in reader sensors. The present invention overcomes these difficulties by using a Ta/NiCr/IrMn70 structure (as compared to Ta/NiCr/MnPt125).

We will further disclose the present invention through a description of a process for its manufacture. Referring now to FIG. 2, the process begins with the provision of lower shield layer 10 whose upper surface is then cleaned through plasma etching using argon flowing at a rate of about 30 SCCM at a power level of about 50 W for about 10 minutes, followed by the deposition of tantalum layer 21, between about 3 and 10 Angstroms thick, on this cleaned surface. Next, NiCr layer 31, between about 30 and 60 Angstroms thick, is deposited onto tantalum layer 21. Layers 21 and 31, together, now form a seed layer.

Once this seed layer has been formed, as described above, layer 22 of IrMn is deposited thereon to a thickness between 40 and 80 Angstroms. This is followed by the formation of the pinned layer—AP2 layer 13 is deposited on the IrMn layer, followed by AFM coupling layer 14 and then by AP1 layer 15.

Next is the deposition of the non-magnetic spacer layer. In one embodiment, illustrated in FIG. 2, the is copper layer 16. In a second embodiment, the spacer layer can be further improved, as follows:

Referring now to FIG. 3, lower copper layer 32 is deposited onto AP1 layer 15. to a thickness between about 1.5 and 6 Angstroms followed by the deposition thereon of AlCu layer 33, between about 6 and 10 Angstroms thick. This AlCu layer is then subjected to a low power plasma etch so that about 1-3 Angstroms of it get removed. Details of this step include using argon flowing at a rate of about 50 SCCM at a power level of about 17-20 W for about 20-60 seconds.

Then, AlCu layer 33 is subjected to plasma oxidation which converts the AlCu layer into a porous aluminum oxide layer whose pores are filled with copper. Details of the plasma oxidation process include using argon flowing at a rate of about 30 SCCM, together with oxygen flowing at about 1 SCCM, at a power level of about 20-30 W for about 15-45 seconds. Formation of the non-magnetic spacer layer is completed with the deposition of copper layer 34 which is connected to layer 32 through said copper filled pores.

The process concludes with the deposition of free layer 17 (of a material such as CoFe, CoFe/NiFe, or (CoFeCu)$_2$/CoFe to a thickness between about 15 and 60 Angstroms) onto layer 34 followed by the formation, on free layer 17, of capping layer 18 (of a material such as Cu/Ta, CuRu, or Cu/Ru/Ta/Ru.

CPP GMR devices made according to the process we have just described have a GMR ratio greater than 5% and a R.A product that is greater than 0.4 ohm.μm$^2$.

Confirmatory Results

Figure 4:
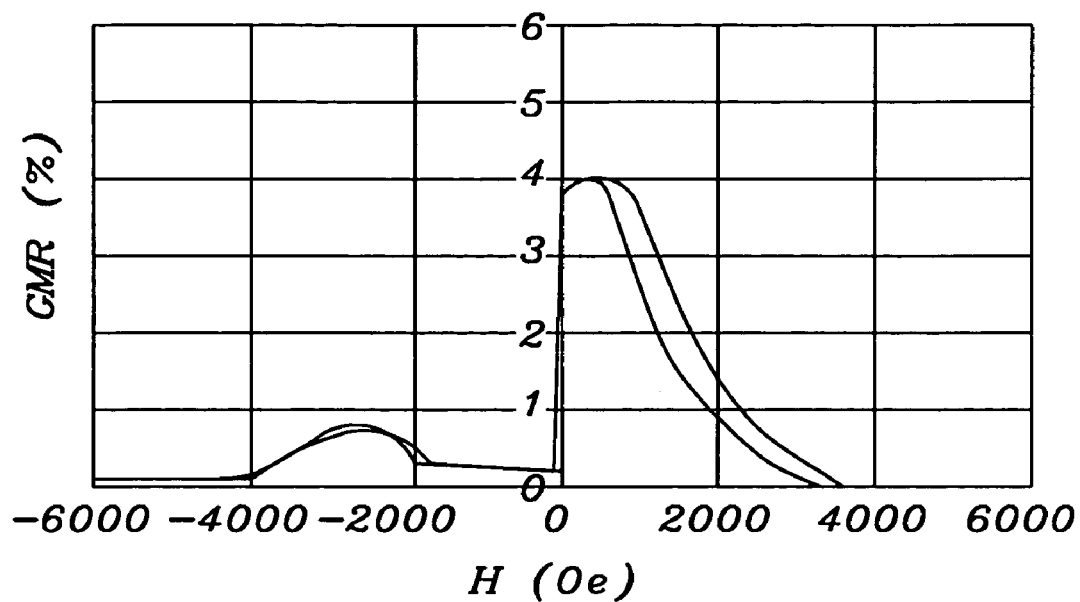
FIGS. 4 and 5 compare, respectively, GMR ratio curves for CPP devices having a conventional seed layers and devices with seed layers of the type taught by the present invention.
Figure 5:
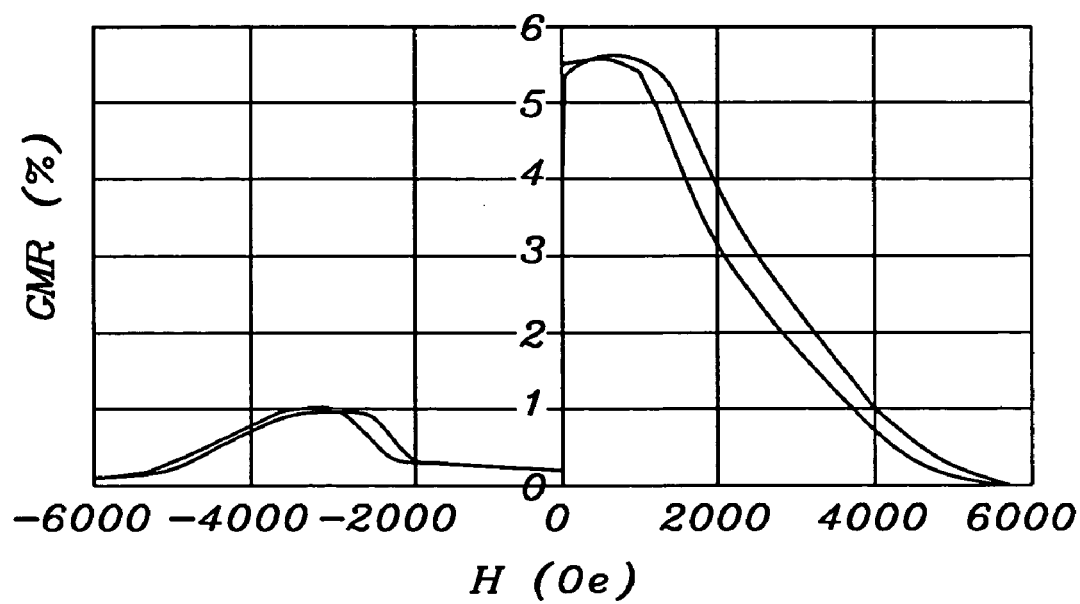

Referring now to FIG. 4, we show the GMR curve for a CIP device having a conventional seed (45 Å of NiCr). The CIP device whose GMR curve is shown in FIG. 5 had a seed layer made up of 45 Å of NiCr on 5 Å of Ta. The remaining structure for both devices was as follows:

NiFe200/seed/IrMn70/Fe$_{25}$Co30/Ru7.5/CoFe35/ Cu30/CoFe30/Cu10/NiCr50

The CIP GMR of Ta/NiCr seed layer is higher than that of NiCr only, which may indicate better crystalline structure so it is expected that the CPP GMR will also be better. Structure with Ta/NiCr seed layer showed better pinning field than NiCr only seed layer, which potentially can help to make AP1/AP2 thicker for better CPP GMR;

A typical CPP structure with NOL in spacer is:
Seed/AFM/AP2/Ru/AP1/Cu/Cu/NOL/free layer/cap.

In TABLE I below we compare CPP GMR properties between devices having a Ta/NiCr/IrMn/. . . and Ta/Ru/PtMn . . . structure.

TABLE I

| Seed & pinning layer | AP2 | AP1 | Cu/NOL/Cu | RA(ohmμm$^2$) | DR/R(%) |
|---|---|---|---|---|---|
| Ta50/Ru20/MnPt150 | CoFe16/FeTa10/CoFe10 | CoFe36 | 2.6/8.0/5 | 0.54 | 2.93 |
| " | " | CoFeCu36 | 2.6/8.0/5 | 0.45 | 3.8 |
| " | " | " | 2.6/8.0/2 | 0.45 | 4.3 |
| " | " | Fe$_{25}$Co36 | 2.6/8.0/2 | 0.2 | 4.5 |
| Ta5NiCr45/IrMn70 | Fe$_{25}$Co36 | CoFe36 | 2.6/8.0/5 | 0.54 | 3.2 |
| " | " | CoFeCu36 | 2.6/8.0/5 | 0.86 | 3.57 |
| " | " | " | 2.6/8.0/2 | 0.9 | 4.18 |
| " | " | Fe$_{25}$CoCu36 | 2.6/8.0/2 | 0.5 | 5.58 |

Free layer in all cases was CoFe12/NiFe35

From Table I, it is clearly seen that Ta/NiCr/IrMn gave a better CPP GMR ratio than Ta/Ru/PtMn, which is very desirable for higher signal in CPP GMR head. In comparison, Ta/NiCr/IrMn seed/AFM combination offers the following advantages over the reference case:
1) thinner seed layer/AFM thickness; with narrower shield-shield spacer better extendability for higher density;
2) higher GMR ratio;
3) less hysteresis in the pinned layer (not shown)

What is claimed is:

1. A process to manufacture a CPP GMR read head, comprising:
    providing a lower shield layer having an upper surface and then cleaning said upper surface through plasma etching;
    depositing a layer of tantalum, between about 3 and 10 Angstroms thick, on said cleaned surface;
    depositing a layer of NiCr, between about 30 and 60 Angstroms thick, on said layer of tantalum whereby said tantalum and NiCr layers together form a seed layer;
    depositing a layer of IrMn on said seed layer;
    on said IrMn layer, depositing an AP2 layer;
    depositing a layer of AFM coupling material on said AP2 layer;
    depositing an AP1 layer on said layer of AFM coupling material;
    depositing a non-magnetic spacer layer on said AP1 layer;
    depositing a free layer on said non-magnetic spacer layer; and
    forming a capping layer on said free layer.

2. The process described in claim 1 wherein said IrMn layer is deposited to a thickness between 40 and 80 Angstroms.

3. The process described in claim 1 wherein said CPP GMR read head has a GMR ratio greater than 5%.

4. The process described in claim 1 wherein said free layer is selected from the group consisting of CoFe, CoFe/NiFe, and [CoFeCu]$_2$/CoFe.

5. The process described in claim 1 wherein said free layer has a thickness between about 15 and 60 Angstroms.

6. The process described in claim 1 wherein said capping layer is selected from the group consisting of Cu/Ta, GuRu, and Cu/Ru/Ta/Ru.

7. The process described in claim 1 wherein the step of cleaning said upper surface through plasma etching further comprises using argon flowing at a rate of about 30 SCCM at a power level of about 50 W for about 10 minutes.

8. A process to manufacture a CPP GMR read head, comprising:
    providing a lower shield layer having an upper surface and then cleaning said upper surface through plasma etching;
    depositing a layer of tantalum, between about 3 and 10 Angstroms thick, on said cleaned surface;
    depositing a layer of NiCr, between about 30 and 60 Angstroms thick, on said layer of tantalum whereby said tantalum and NiCr layers together form a seed layer;
    depositing a layer of IrMn on said seed layer;
    on said IrMn layer, depositing an AP2 layer;
    depositing a layer of AFM coupling material on said AP2 layer;
    depositing an AP1 layer on said layer of AFM coupling material;
    depositing a first copper layer, between about 1.5 and 6 Angstroms thick, on said AP1 layer;
    depositing an AlCu layer, between about 6 and 10 Angstroms thick, on said first copper layer;
    then subjecting said AlCu layer to a low power plasma etch, thereby removing about 1 to 3 Angstroms of said AlCu layer;
    then converting said AlCu layer to a nano-oxide layer by means of plasma oxidation;
    then depositing a second copper layer on said nano-oxide layer whereby said first and second copper layers, together with said nano-oxide layer, form a non-magnetic spacer layer on said AP1 layer;
    then depositing a free layer on said non-magnetic spacer layer; and
    forming a capping layer on said free layer.

9. The process described in claim 8 wherein said IrMn layer is deposited to a thickness between 40 and 80 Angstroms.

10. The process described in claim 8 wherein said CPP GMR read head has a GMR ratio greater than 5%.

11. The process described in claim 8 wherein said free layer is selected from the group consisting of CoFe, CoFe/NiFe, and (CoFeCu)$_2$/CoFe.

12. The process described in claim 8 wherein said free layer has a thickness between about 15 and 60 Angstroms.

13. The process described in claim 8 wherein said capping layer is selected from the group consisting of Cu/Ta, GuRu, and Cu/Ru/Ta/Ru.

14. The process described in claim 8 wherein the step of cleaning said upper surface through plasma etching further comprises using argon flowing at a rate of about 30 SCCM at a power level of about 50 W for about 10 minutes.

15. The process described in claim 8 wherein the step of subjecting said AlCu layer to said low power plasma etch further comprises using argon flowing at a rate of about 50 SCCM at a power level of about 17 to 20 W for about 20 to 60 seconds.

16. The process described in claim 8 wherein the step of converting said AlCu layer to said nano-oxide layer by means of plasma oxidation further comprises using argon flowing at a rate of about 50 SCCM, together with oxygen flowing at a rate of 15 SCCM, at a power level of about 20 to 30 W for about 15 to 45 seconds.

17. The process described in claim 8 wherein said CPP GMR read head has a R.A product that is greater than 0.4 ohms.m$^2$.

* * * * *